(12) United States Patent
Sedoni et al.

(10) Patent No.: US 8,251,462 B2
(45) Date of Patent: Aug. 28, 2012

(54) TRAILER BRAKING DEVICE

(75) Inventors: Enrico Sedoni, Modena (IT); Gianpaolo Pasini, Modena (IT)

(73) Assignee: CNH America LLC

( * ) Notice: Subject to any disclaimer, the term of this patent is extended or adjusted under 35 U.S.C. 154(b) by 911 days.

(21) Appl. No.: 12/269,815

(22) Filed: Nov. 12, 2008

(65) Prior Publication Data

US 2009/0127042 A1 May 21, 2009

(30) Foreign Application Priority Data

Nov. 20, 2007 (EP) .................................... 07425735

(51) Int. Cl.
*B60T 7/20* (2006.01)
(52) U.S. Cl. ..................................... 303/123; 303/118.1
(58) Field of Classification Search .................. 303/123, 303/118.1, 116.2, 119.1, 119.2, 3, 4, 11, 303/12

See application file for complete search history.

(56) References Cited

U.S. PATENT DOCUMENTS

| 5,806,937 | A | 9/1998 | Brunson | |
| 6,644,761 | B2 * | 11/2003 | Schuck | 303/123 |
| 7,020,551 | B2 * | 3/2006 | Goebels et al. | 303/118.1 |

FOREIGN PATENT DOCUMENTS

| DE | 10 2005 003261 | 8/2006 |
| EP | 1538044 | 6/2005 |
| WO | WO 96/26853 | 9/1996 |

* cited by examiner

*Primary Examiner* — Melanie Torres Williams
(74) *Attorney, Agent, or Firm* — Sue C. Watson; Patrick Sheldrake

(57) ABSTRACT

A trailer braking device having a high-pressure main hydraulic circuit of a tractor to which a trailer is attached; to a hydraulic circuit of a master brake cylinder of the tractor; and a trailer brake valve having a driver connected hydraulically to the high-pressure main hydraulic circuit and to the hydraulic circuit. The driver of the device has a piston which is subjected to a first action by an independent circuit that is activated, for example, by the stop lights and a second action produced by the operator, such as a foot acting on a brake pedal, on the hydraulic circuit of the master brake cylinder.

6 Claims, 3 Drawing Sheets

TRAILER BRAKING DEVICE

The present invention relates to a trailer braking device.

In tractor braking systems, when the control brake is activated lightly, the braking system of a trailer attached to the tractor, even though activated, may be unable to produce sufficient braking force, because the force necessary to activate the brakes is normally not taken into account. As a result, the trailer may not brake at all, or not sufficiently.

Conversely, in imperfectly balanced systems, the trailer may brake too much, more than the tractor, thus resulting in serious problems regarding the tractor-trailer interface devices.

As a result, the tractor brakes may be called upon to deal with enormous amounts of energy (e.g. light braking to slow down or maintain downhill speed), so, even though well designed in relation to the mass of the tractor, have a very short working life. To eliminate these drawbacks, the braking rates of the tractor and trailer are normally unbalanced to a great extent, but this has failed to provide a satisfactory solution.

Moreover, the trailer, especially light-weight trailers, may be braked too much and too sharply; in which case, operator sensitivity is to no avail.

SUMMARY OF THE INVENTION

The invention assists in synchronizing the braking forces associated with a trailer braking device to such an extent as to prevent the energy braked by one system from overloading the other, which is particularly serious in the case of long-term braking with a light load.

The invention employs an ON/OFF solenoid valve, which comes into operation when the stop signal is ON, and which provides for additional pressure (from an independent source) on the trailer brake valve driver.

In the proposed solution, the trailer brake driver comprises two separate chambers. A first is a so-called "control chamber", which is connected directly to the tractor braking pressure, performs the same function as the currently produced chamber, and provides for regulating trailer braking pressure according to the tractor braking pressure.

The second chamber, known as "offset chamber", only connects the independent source to the trailer brake valve when the stop signal is ON. As soon as the operator touches the brake pedal, the stop signal (i.e. stop lights) comes ON, and the ON/OFF valve is opened. When this happens, the geometry of the offset chamber is such that the pressure of the fluid inside it produces a predetermined force on the trailer brake valve driver, so as to achieve a simultaneous braking force origin, regardless of any difference in the force with which the two (tractor-trailer) braking systems are activated. This force is maintained throughout braking, in addition to the braking control force from the master cylinder of the tractor, and also provides for better distributing braking intensity between the tractor and trailer.

By evaluating the pressure in the offset chamber energy supply circuit, and appropriately designing the offset chamber, it is possible to set the trailer braking origin, with respect to the tractor braking origin, within a "brake lead area".

Moreover, the offset chamber is purposely designed so that the offset force is added to the braking control force throughout braking control.

In a second embodiment, the hydraulic circuit is replaced by an electric current which, flowing through a coil, generates a force on permanent magnets to move a trailer brake actuating piston, which is also subjected to a force produced by the pressure in the control chamber from the master brake cylinder.

The trailer braking device is designed to assist in the elimination of the aforementioned drawbacks, and which at the same time is cheap and easy to produce.

BRIEF DESCRIPTION OF THE DRAWINGS

A number of non-limiting embodiments of the present invention will be described by way of example with reference to the accompanying drawings, in which.

It should be pointed out that only the parts in the attached drawings essential to a clear understanding of the present invention are numbered and described in the following description.

DETAILED DESCRIPTION OF THE INVENTION

Figure 1:
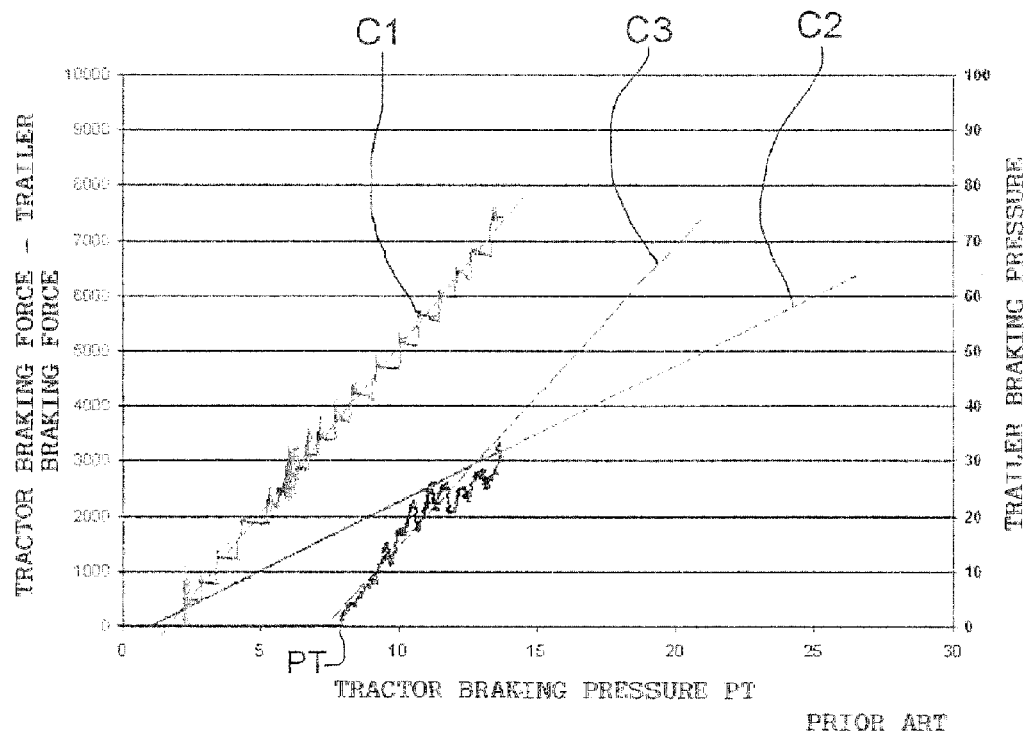
FIG. 1 shows a graph relative to the known art.

The graph of FIG. 1 shows the performance of the component parts of a known trailer braking device. The x axis shows tractor braking pressure, and the y axis trailer braking pressure, the pattern of which, alongside variations in tractor braking pressure, is shown by curve C1. Curve C2 shows the tractor braking force alongside variations in tractor braking pressure; and curve C3 the trailer braking force, also as a function of tractor braking pressure.

Figure 2:
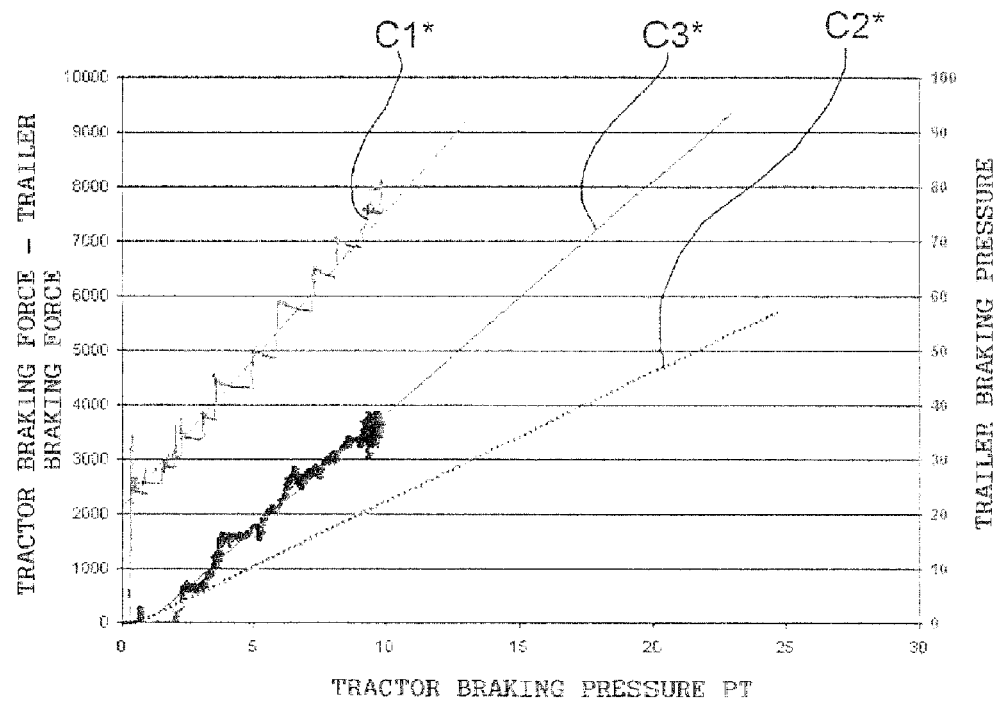
FIG. 2 shows a graph relative to the present invention.

As shown clearly in FIG. 1, a certain hysteresis exists between the trailer braking force response (curve C3) and the tractor braking force response (curve C2), i.e. a given tractor braking pressure PT must be reached before the trailer begins braking. And which is the cause of the drawbacks referred to above. The present invention works to move the start of curve C3* substantially up to the point of origin of curve C2, which, in the example shown, is the origin of the coordinates, as shown in FIG. 2.

Point PT is moved towards the predetermined "zero point" by supplying the trailer braking device immediately with a certain amount of preliminary control pressure, regardless of whether or not pressure has been generated on the master cylinder of the tractor. One method by which this can be accomplished is by commencing preliminary pressure supply as soon as the operator presses the tractor brake pedal. More specifically, preliminary pressure supply may coincide with turn-on of the stop lights.

Figure 3:
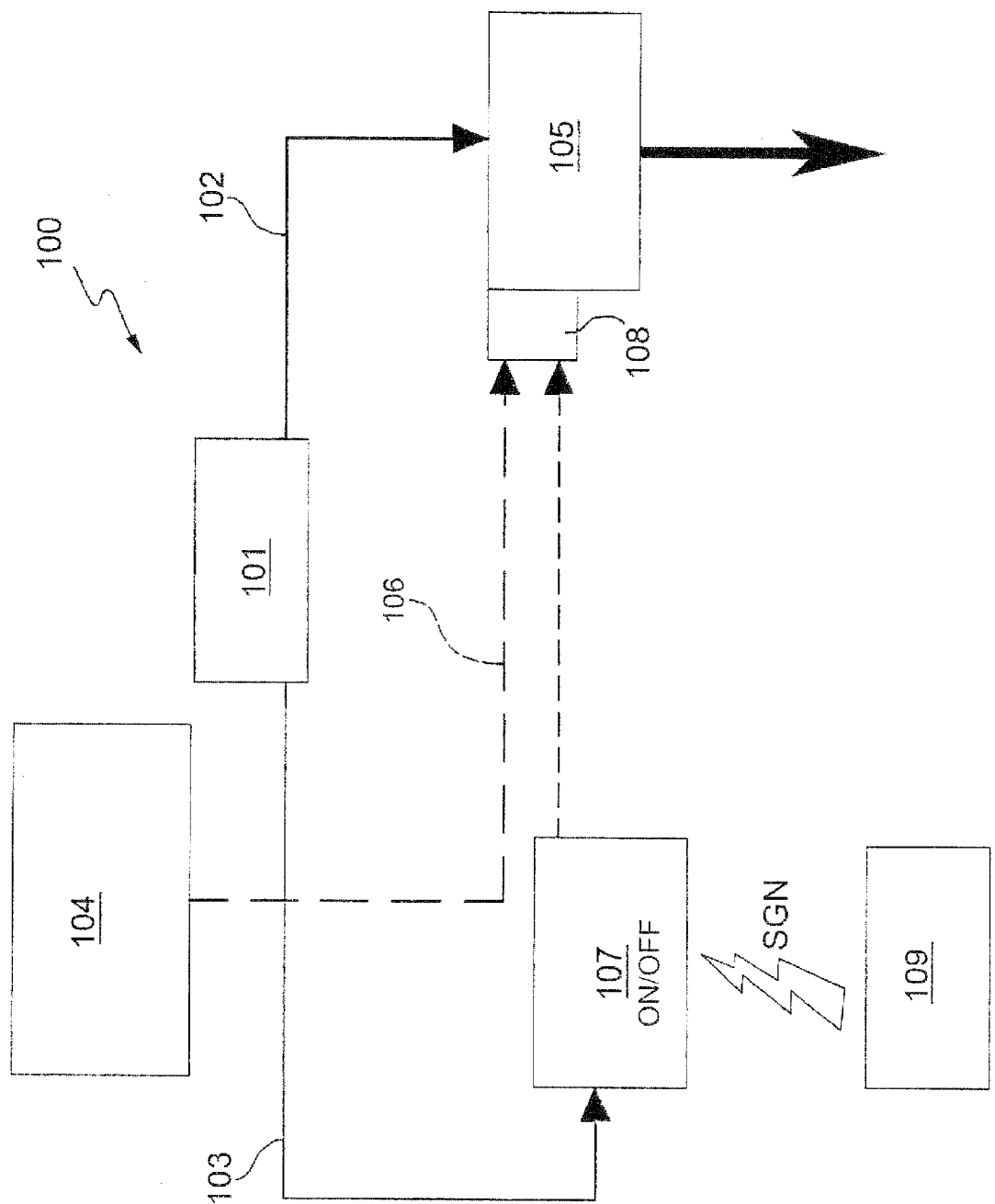
FIG. 3 shows a diagram of a trailer braking device in accordance with the present invention.

FIG. 3 shows a trailer braking device 100 having a pump 101 supplying a first high-pressure (e.g. 200 bar) main hydraulic circuit 102, and a second low-pressure (e.g. 20 bar) main hydraulic circuit 103.

Device 100 also comprises, in known manner, a master brake cylinder 104 of the tractor (not shown) connected hydraulically to a brake valve 105 of a trailer (not shown) by a third hydraulic circuit 106. As explained in detail below, valve 105 is also connected hydraulically to first main hydraulic circuit 102 and second main hydraulic circuit 103.

The second main circuit 103 comprises an ON/OFF valve 107 upstream from supply of the pressurized oil from second main circuit 103 to a driver 108 of valve 105.

Figure 4:
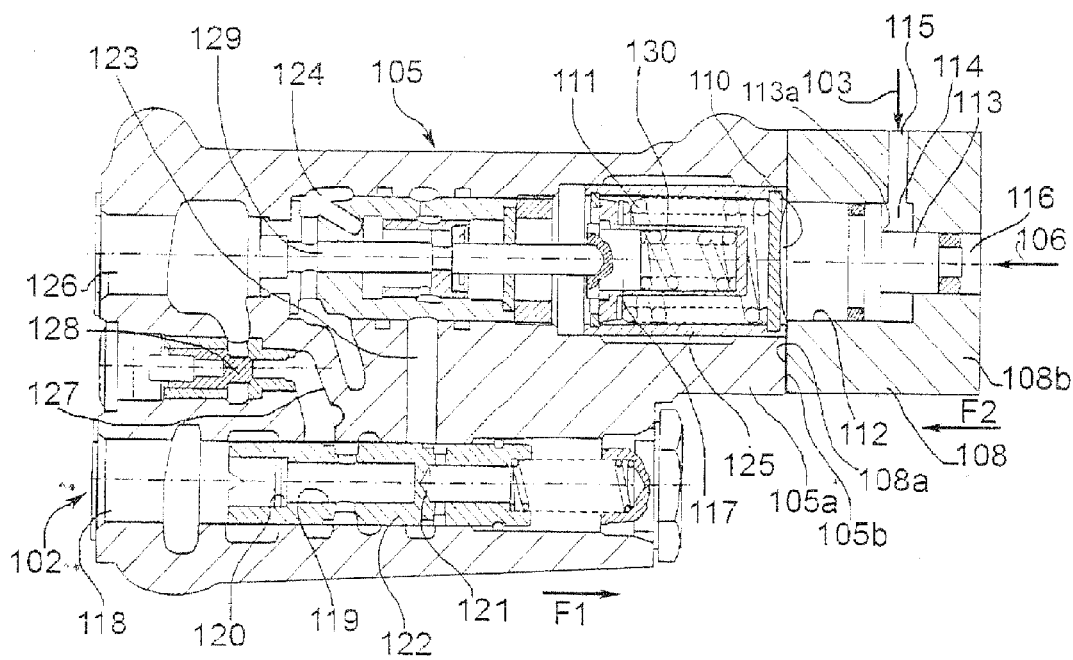
FIG. 4 shows a first embodiment of a brake valve of the FIG. 3 braking device.

Driver 108 is actually also connected hydraulically to third hydraulic circuit 106 originating from master brake cylinder 104 of the tractor as shown in FIG. 4.

As shown in FIG. 3, ON/OFF valve 107 is activated by turn-on of a light device 109 indicating initial braking of the tractor. In other words, light device 109 comprises, in known manner, the lights that come on at the rear of the tractor and trailer as soon as the operator touches the brake pedal.

More specifically, ON/OFF valve 107 is activated by light device 109 generating an electric signal SNG the instant the operator touches the brake pedal. The braking pressure of the trailer is locked to that of an independent circuit having a constant pressure followed immediately by additional pressure directly from the brake pedal.

A brake valve 105 of a trailer (not shown) is inserted by a third hydraulic circuit 106; and valve 105 is also connected hydraulically to first main hydraulic circuit 102 and second main hydraulic circuit 103. The second main circuit 103 comprises an ON/OFF valve 107 upstream from supply of the pressurized oil from second main circuit 103 to a driver 108 of valve 105.

It should be pointed out that the present invention can also apply to pneumatic circuits substituted for at least part of the hydraulic circuits.

As shown in FIG. 4, valve 105 comprises a main body 105a having a face 105b against which rests a corresponding face 108a of a main body 108b of driver 108. The two faces 105b and 108a have a common opening 110 connecting a chamber 111, formed in main body 105a of valve 105, to a chamber 112 formed in main body 108b of driver 108.

Chamber 112 houses a piston 113 having a shoulder 113a. Shoulder 113a, together with the walls of chamber 111, defines an annular offset chamber 114 connected hydraulically to an inlet 115 of second main circuit 103.

Main body 108b of driver 108 comprises a further inlet 116 connected to third hydraulic circuit 106; and the pressure of the fluid in third hydraulic circuit 106 is determined by the pressure exerted by the operator on the brake pedal. Piston 113 acts as an "adder" to add the pressure in third hydraulic circuit 106—which increases as shown by curve C1* in FIG. 2—to a fixed pressure from second main circuit 103, when the stop lights of the tractor and trailer come on. In known manner in brake technology, piston 113 acts on a plunger 117.

Valve 105 also comprises an inlet 118 for pressurized oil from first main hydraulic circuit 102. A conduit 119 originates at inlet 118, and has a diaphragm 120 and a choke 121. The pressurized oil flowing through diaphragm 120 and choke 121 activates a flow regulator 122 in the direction of arrow F1. Most of the oil flows through a fitting (not shown) to auxiliary distributors (not shown), while the rest is discharged to a hydraulic lifter (not shown) via a conduit 123, plunger 117, and an oil drain outlet 124.

When the tractor brake pedal is pressed, the hydrostatic circuit oil at inlet 116 is pressurized, and moves piston 113, a pressure regulator 125, and plunger 117 in the direction of arrow F2, and plunger 117 in turn cuts off connection between oil drain outlet 124 and both a trailer brake fitting 126 and conduit 123.

In this configuration, part of the oil from first main hydraulic circuit 102 still flows to the auxiliary distributors (not shown), while the rest is supplied to the trailer brakes via diaphragm 120, a conduit 127, a non-return valve 128, and fitting 126.

As it increases in pressure, the oil in fitting 126 acts on an active surface 129 of plunger 117 in opposition to the pressure exerted on piston 113 by the oil in the hydrostatic brake circuit of the tractor (third hydraulic circuit 106).

As pressure on the tractor brake pedal increases, the oil in fitting 126 increases in pressure and, acting on active surface 129 of plunger 117, moves plunger 117 in the direction of arrow F1 in opposition to springs 130 of pressure regulator 125.

When the oil pressure in fitting 126 to brake the trailer equals the pressure exerted by springs 130, plunger 117 is stabilized and connects the oil from first main hydraulic circuit 102 to the lifter drain via inlet 118, diaphragm 120, choke 122, conduit 123, and oil drain 124.

Diaphragm 120 and choke 122 produce a fall in pressure of the oil in pressure regulator 125 and move pressure regulator 125 in the direction of arrow F2, thus closing conduit 127 and, hence, non-return valve 128.

Further increase in pressure on the tractor brake pedal moves piston 113, pressure regulator 125, and plunger 117 in the direction of arrow F2, thus increasing the oil pressure in the trailer braking system, and repeating the steps described above with reference to the initial braking stage.

If, for external reasons, the pressure in the trailer braking circuit increases, plunger 117 immediately connects inlet 118 and oil drain 124 to maintain perfectly balanced pressure between the oil in the braking system and springs 130 of pressure regulator 125.

When the tractor brake pedal is released, the oil pressure at inlet 116 falls, and the system returns to the initial configuration.

Figure 5:
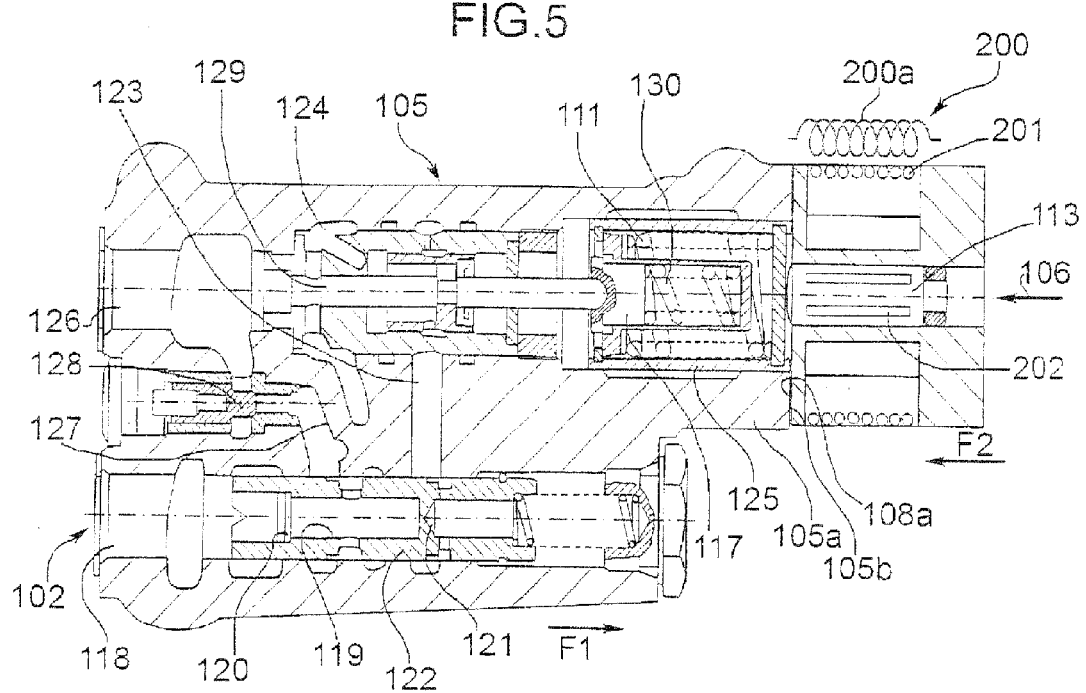
FIG. 5 shows a second embodiment of a brake valve of the FIG. 3 braking device.

The FIG. 5 embodiment differs from the one in FIG. 4 by additional operation of piston 113 being controlled by electric as opposed to hydraulic means.

In this case, when the brake lights are operated, a constant electric current flows along an electric circuit 200 comprising a first coil 200a, which produces a magnetic field which in turn induces current in a second coil 201 integral with main body 108b of driver 108. The electric current in second coil 201 in turn produces a magnetic field which interferes with permanent magnets 202 on piston 113, so piston 113 moves in the direction of arrow F2.

In the FIG. 5 embodiment, electromagnetic means produce the same effect on piston 113 as the hydraulic means in the FIG. 4 embodiment.

It is a likely advantage to employ an ON/Off solenoid valve so that it only comes into operation when the stop signal is ON, and which provides for "zero-cost" additional pressure by employing existing hydraulic and/or pneumatic and/or electric circuits on the tractor.

We claim:

1. A trailer braking device comprising:
a trailer brake valve having a driver configured for hydraulic connection to a high-pressure main hydraulic circuit of a tractor and to a hydraulic circuit of a master brake cylinder of a tractor;
the driver comprising a first chamber for regulating trailer braking pressure according to tractor braking pressure, and a second chamber connected to an independent source only when activated by means connected to a braking device of the tractor,
the driver having a piston which is subjected to a first action by the independent source configured for activation by the means connected to the braking device, and a second action by an operator acting directly on the hydraulic circuit of the master brake cylinder of the tractor which results in additional pressure directly from the brake pedal of the tractor, such that the first action causes a preliminary pressure supply of fluid inside the second chamber to produce an immediate predetermined force on the trailer brake valve driver, the first action and the second action resulting in near simultaneous braking force of the tractor and trailer, the predetermined force from the first action maintained during braking.

2. A device as claimed in claim 1, wherein the means connected to a braking device of the tractor comprise stop lights.

3. A device as claimed claim 1, wherein the independent source is a circuit in which pressurized fluid flows.

4. A device as claimed in claim 1, wherein the independent source is an electric circuit comprising a coil.

5. A device as claimed in claim 3, wherein the driver comprises an annular offset chamber connected hydraulically to an inlet of a main circuit by which a constant force is generated on said piston.

6. A device as claimed in claim 5, characterized in that said main circuit comprises an ON/OFF valve upstream from supply of pressurized oil from the main circuit to a driver of said trailer brake valve.

* * * * *